March 11, 1924.
F. E. MAYOL
CONFECTION CONTAINER
Filed June 28, 1922
1,486,445
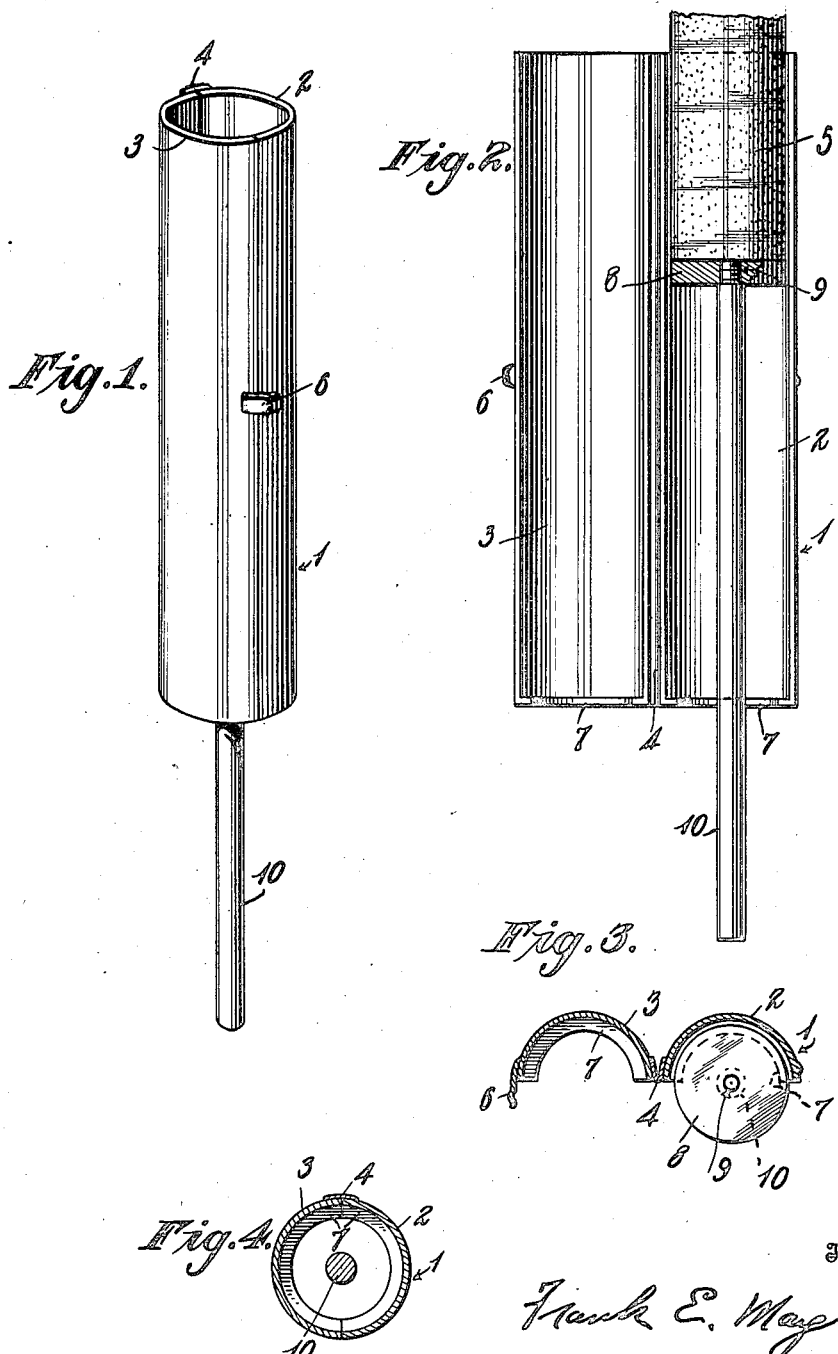
Inventor
Frank E. Mayol
By Bauer & Thomas
Attorneys Patented Mar. 11, 1924.

1,486,445

UNITED STATES PATENT OFFICE.

FRANK E. MAYOL, OF SALT LAKE CITY, UTAH.

CONFECTION CONTAINER.

Application filed June 28, 1922. Serial No. 571,333.

*To all whom it may concern:*

Be it known that I, FRANK E. MAYOL, citizen of the United States, residing at Salt Lake City, in the county of Salt Lake and State of Utah, have invented certain new and useful Improvements in Confection Containers, of which the following is a specification.

The invention relates to improvements in a container for confectionery, particularly ice cream bars, and the like.

It is an object of my invention to provide a container having disposed therein a frozen dainty or confection with means whereby the confection is progressively moved from the container as it is being consumed. It is appreciated that the handling of frozen dainties is very difficult, especially in warm weather, and it is therefore a primary feature of this invention to provide a container in which the dainty may or may not be originally contained having a manually operated plunger member whereby the dainty may be progressively removed from the container as it is consumed without the hand of the user coming in direct contact therewith. When the dainty is originally stored within the container, the same acts as a wrapper therefor, although it will be appreciated that the dainties may be placed within the container at any time the user should so desire.

In the accompanying drawings I have shown one embodiment of this invention, wherein Figure 1 illustrates a view of the container in an open condition; and, Figure 2 illustrates a view thereof with a dainty in the closed container.

Figs. 3 and 4 are transverse sections of Figs. 2 and 1, respectively.

Referring now more particularly to the drawings, wherein like reference characters indicate corresponding parts, the numeral 1 designates the body of the container which is preferably formed of card board or the like. The container, however, may be formed of thin veneer, or any other suitable material. It is preferably composed of the sections 2 and 3. These sections are united at the joint 4 by glue, a tape or the like, the joint being so constructed that the sections can open and close. The front section 3 of the container is preferably given an ornamental appearance and bears the trade name of the confection that is contained therein. The container is moved to the open position as shown in Figure 1, and the confection 5 consisting of a frozen bar of ice cream containing fruits and the like, is placed therein, whereupon the two halves 2 and 3 are closed and joined to be retained in a closed position by the fastening devices 6 so that the confection is entirely enclosed within the container.

The lower portions of each section of the container 2 and 3 are provided with a slightly inturned flange 7, while the upper edges have no inwardly extending parts. Seated upon the flange 7 when a confection 5 is placed within the container is a plunger 8 of about the same cross section as the cavity formed by the sections 2 and 3 closing the bottom of the container and upon which the frozen dainty rests. This bottom 8 may be constructed of card board, wood or the like, and is of a diameter slightly less than the diameter of the confection receiving cavity in the container. The plunger is formed with a central opening 9 therein receiving the plunger rod 10 which projects materially beyond the bottom of the container when a full dainty is positioned therein. The plunger 8 is free to reciprocate within the container when the sections thereof are closed and it is obvious that such a reciprocation will expose or project the dainty 5 beyond the upper edge of the container so that it can be consumed without exposing the entire confection to view, or without handling the same with the hands of the user, which are of course decidedly unsanitary and disagreeable, especially where a chocolate coating surrounds the dainty.

From the foregoing description it is thought that the operation of this device will be clearly understood, but it will be briefly recited as follows: The container 1 either comes equipped with a frozen dainty 5 or the same is sold as a separate article and the dainty placed therein. The side walls of the container are of course closed so that the dainty is hidden from view. As the dainty is consumed, the plunger rod 10 is gradually lifted forcing the plunger 8 outwardly, which raises the dainty and progressively exposes the upper portion thereof beyond the upper edge of the container.

This is continued until the entire dainty is consumed.

Having thus described my invention, what I claim is:

A container of the character described comprising a pair of semi-circular side walls having inturned flanges at the lower ends thereof, means for retaining said walls in a closed position to provide a closed space adapted to receive a confection, a bottom disposed within said container and normally resting on said inturned flanges, and means connected with the bottom whereby the same may be progressively raised to eject the confection through an opening in the upper end of the container.

In testimony whereof I affix my signature.

FRANK E. MAYOL.